United States Patent
Zhou et al.

(10) Patent No.: US 7,974,621 B2
(45) Date of Patent: Jul. 5, 2011

(54) METHOD AND APPARATUS FOR TRANSITIONING BETWEEN RADIO LINK PROTOCOLS IN A PACKET-BASED REAL-TIME MEDIA COMMUNICATION SYSTEM

(75) Inventors: Tong Zhou, Overland Park, KS (US); David Mohan, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 787 days.

(21) Appl. No.: 10/991,783

(22) Filed: Nov. 18, 2004

(65) Prior Publication Data

US 2006/0104228 A1    May 18, 2006

(51) Int. Cl.
*H04W 4/00* (2009.01)
(52) U.S. Cl. ............... 455/432.2; 455/448; 455/450; 455/451; 455/452.1; 455/452.2; 455/453; 455/454; 455/509; 455/511; 370/329; 370/331; 370/335; 370/341; 370/328; 370/349
(58) Field of Classification Search ............... 370/349, 370/328, 329, 331, 335, 341; 455/448, 432.2, 455/432.3, 450, 451, 452.1, 452.2, 453, 454, 455/509, 511
See application file for complete search history.

(56) References Cited

U.S. PATENT DOCUMENTS

| | | | |
|---|---|---|---|
| 6,204,808 B1 | 3/2001 | Bloebaum et al. | |
| 6,795,444 B1 * | 9/2004 | Vo et al. | 370/401 |
| 6,987,985 B2 * | 1/2006 | Purkayastha et al. | 455/552.1 |
| 2002/0172169 A1 | 11/2002 | Rosen et al. | |
| 2003/0148779 A1 | 8/2003 | Aravamudan et al. | |
| 2003/0152044 A1 * | 8/2003 | Turner | 370/328 |
| 2003/0190888 A1 * | 10/2003 | Mangal et al. | 455/3.05 |
| 2004/0162084 A1 | 8/2004 | Wang | |
| 2004/0162892 A1 * | 8/2004 | Hsu | 709/221 |
| 2004/0219940 A1 * | 11/2004 | Kong et al. | 455/518 |
| 2005/0188093 A1 * | 8/2005 | Haddad | 709/228 |

(Continued)

FOREIGN PATENT DOCUMENTS

WO    WO 2004/082219 A2    9/2004

OTHER PUBLICATIONS

International Search Report from International Application No. PCT/US2005/032739, dated Jan. 16, 2006.
Written Opinion from International Application No. PCT/US2005/032739, dated Jan. 16, 2006.
Office Action from Canadian Application No. 2,582,110, dated Sep. 1, 2010.

(Continued)

*Primary Examiner* — Patrick N Edouard
*Assistant Examiner* — Shantell Heiber

(57) ABSTRACT

A method and apparatus for transitioning between radio link protocols in a packet-based real-time media communication system. A wireless communication device such as a cell phone will operate under one radio link protocol (such as IS-856, also known as 1xEV-DO) to engage in packet-based signaling for setup of a packet-based real-time media session such as a push-to-talk session. Once the session is set up, the wireless communication device will then automatically transition to operate under a different radio link protocol (such as IS-2000, also known as 1xRTT), and will engage in packet-based real-time media communication in the session over that different radio link protocol. Preferably, the radio link protocol used for session setup signaling will provide for reduced setup latency, while the radio link protocol used for bearer communication in the session will provide for reduced jitter and improved real-time media communication.

18 Claims, 6 Drawing Sheets

U.S. PATENT DOCUMENTS

| | | |
|---|---|---|
| 2006/0009235 A1 | 1/2006 | Sheynblat et al. |
| 2006/0027185 A1 | 2/2006 | Troxler |
| 2006/0045069 A1 | 3/2006 | Zehavi et al. |
| 2006/0046749 A1 | 3/2006 | Pomerantz et al. |
| 2006/0067302 A1* | 3/2006 | Wengrovitz et al. .......... 370/352 |
| 2006/0128383 A1 | 6/2006 | Arcens |
| 2007/0298806 A1 | 12/2007 | Venkatachalam |

OTHER PUBLICATIONS

U.S. Appl. No. 11/856,342, filed Sep. 17, 2007.

Office Action from U.S. Appl. No. 11/856,342, dated Aug. 4, 2010.

Office Action from U.S. Appl. No. 11/856,342, dated Dec. 8, 2010.

* cited by examiner

METHOD AND APPARATUS FOR TRANSITIONING BETWEEN RADIO LINK PROTOCOLS IN A PACKET-BASED REAL-TIME MEDIA COMMUNICATION SYSTEM

FIELD OF THE INVENTION

The present invention relates to wireless communications and, more particularly, to air interface communications in a packet-based real-time media communication system, such as a "push-to-talk" system for instance.

BACKGROUND

As a general matter, it is known to establish a real-time media conference over a packet-switched network between two or more user stations, each operated by a respective user. A communication server, such as a multipoint conference unit (MCU) for instance, can reside functionally in the network and can operate as a bridging or switching device between the participating stations, to support the conference.

In practice, a participating station might initiate the conference by sending to the communication server a session setup message that identifies the other desired participant(s). In response, the server may then seek to connect each of the designated other participants, such as by forwarding the session setup message or sending a new session setup message to each other party. Ultimately, the server would thereby establish a conference leg with each participating station, including the initiating station, and the server would then bridge together the legs so that the users at the stations can communicate with each other in substantially real-time via the server.

A signaling mechanism such as the well known Session Initiation Protocol (SIP) could be used to initialize the conference and more particularly to set up each conference leg. Further, digitized media (voice, video, etc.) could be packetized and carried between each participating station according to a mechanism such as the well known Real-time Transport Protocol (RTP), for instance. The core industry standards for SIP (Internet Engineering Task Force (IETF) Request For Comments (RFC) 3261) and RTP (IETF RFC 1889) are hereby incorporated by reference.

Packet based media conferencing can be advantageously employed to provide an "instant chat" service, where a user of one station can readily initiate a conference with one or more designated target users at other stations. The initiating user may simply select a target user or group (if not selected by default) and then press an instant connect button on his or her station, and the user's station would responsively signal to a communication server to initiate a conference between the initiating user and the selected user or group. This sort of service is referred to as "instant chat" because it strives to provide a quick connection between two or more users, in contrast to telephone service where a user dials a telephone number of a party and waits for a circuit connection to be established with that party.

An example of an instant chat service is commonly known as "push-to-talk" (PTT). In a PTT system, some or all of the conference stations are likely to be wireless devices such as cellular mobile stations, that are equipped to establish wireless packet-data connectivity and to engage in voice-over-packet (VoP) communication. Alternatively, some or all of the stations could be other sorts of devices, such as multimedia personal computers or Ethernet-telephones, that can establish packet data connectivity and engage in VoP communication through landline connections. Further, each station could be equipped with a PTT button or other mechanism that a user can engage (actuate) in order to initiate an PTT session. Other examples of instant chat service include push-to-view (video conferencing) and the like.

Participation of cellular wireless devices in instant chat sessions, however, raises certain issues, principally due to the arrangement and operation of most cellular communication systems. In a typical cellular communication system, a geographic area is divided into a plurality of wireless coverage areas (e.g., cells and cell sectors), each defined by a radiation pattern from a respective base transceiver station (BTS) tower, and each having a limited extent of radio resources (e.g., frequency, traffic channels, power, etc.) that must be shared among potentially numerous wireless devices operating in the coverage area. To manage the limited extent of radio resources, most cellular communication systems allocate their radio resources dynamically to wireless devices on an as-needed basis. Unfortunately, however, the process of allocating radio resources can itself take up to several seconds to complete, which can introduce unacceptable latency into the process of setting up an "instant" chat session with a wireless device.

This latency problem can arise both at the originating end of an instant chat session (the end that initiates the session) and at each terminating end of the instant chat session (each target end that gets invited to participate in the session).

One established way to mitigate the latency session setup latency is to buffer media at the initiating end. In particular, certain devices that are equipped to support instant chat communication may be programmed to begin receiving and buffering media (e.g., voice) as soon as the user presses and holds an instant-chat button, and to continue doing so until the user releases the instant-chat button. Once an RTP leg is fully established between the device and the communication server, the device may then begin transmitting the buffered media (while also possibly continuing to receive additional media from the user). The end result is that each terminating end would receive the initial stream of media with some artificially introduced delay. However, given that the initiating user is likely to be positioned remotely from each terminating user, this delay would usually not be noticeable.

While buffering of media works well to mitigate latency, however, it does not help to actually reduce or eliminate the latency. Therefore, an improvement is desired.

SUMMARY

The present invention stems initially from a realization that certain air interface communication protocols facilitate faster allocation of radio resources than others and are therefore likely to introduce less latency into the process of setting up an instant chat session. At the same time, however, an air interface communication protocol that functions to rapidly allocate radio resources might not also be optimized for carrying packet-based real-time media traffic. For instance, such a protocol might not provide a bandwidth guarantee and might therefore introduce jitter or delay into real-time communications. Yet other air interface communication protocols might be better suited for carrying packet-based real-time media traffic, by providing guaranteed bandwidth for instance.

To help address this problem, the present invention provides a method and system in which a wireless device will use one air interface protocol when engaging in signaling to establish a packet-based real-time media conference and will then automatically switch over to use another air interface protocol for engaging in bearer communication in the established conference. Preferably, but not necessarily, the first air interface protocol that the device uses for session setup signaling will be well suited to facilitating relatively quick packet-data acquisition, and the air interface protocol to which the device switches for bearer communication in the session will be well suited to carrying real-time media traffic.

BRIEF DESCRIPTION OF THE DRAWINGS

An exemplary embodiment of the invention is described herein with reference to the drawings, in which.

DETAILED DESCRIPTION OF AN EXEMPLARY EMBODIMENT

1. Example Network Architecture and Protocols

Figure 1:
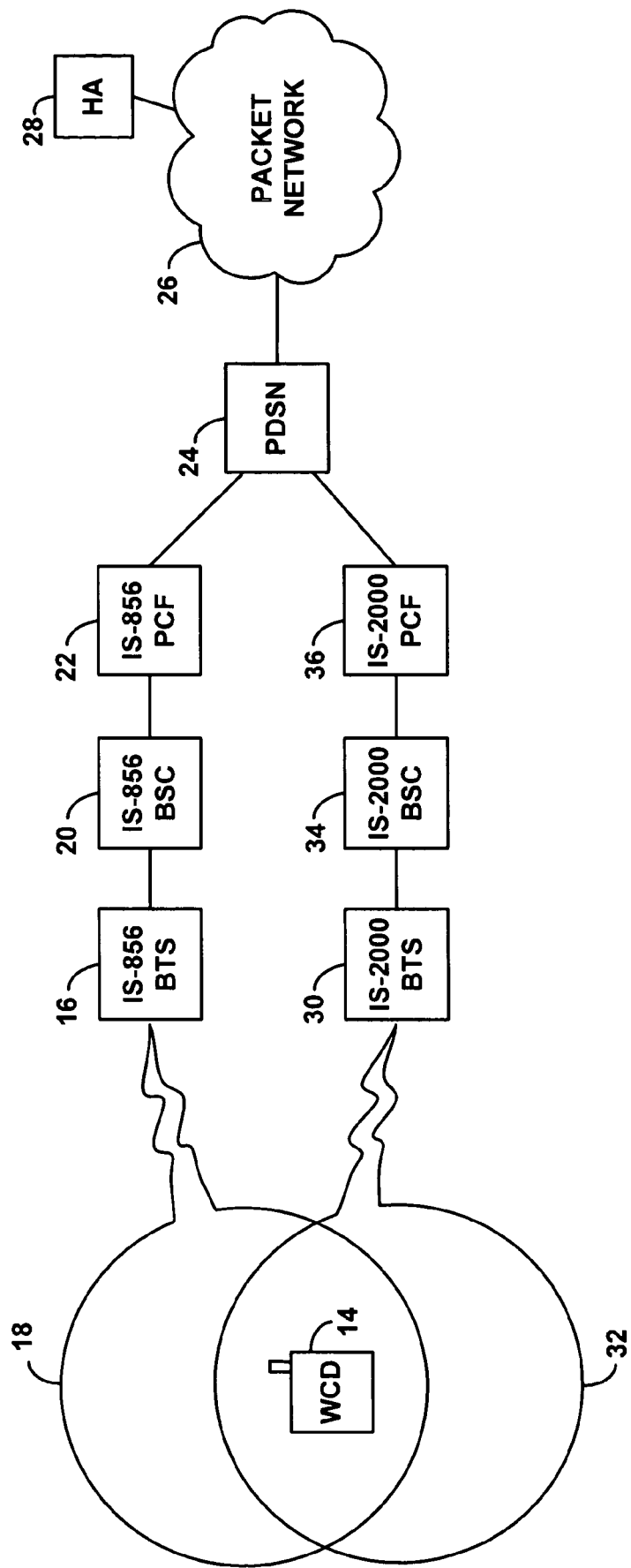
FIG. 1 is a block diagram of an example hybrid communication system in which the exemplary embodiment can be implemented.

According to an exemplary embodiment of the invention, the air interface protocol that the wireless device will use for session-setup signaling will be the high-speed Code Division Multiple Access (CDMA) protocol defined by industry standard IS-856 (sometimes referred to as 1xEV-DO), and the air interface protocol to which the wireless device will automatically switch for use to engage in bearer communication in the established session will be the legacy CDMA protocol defined by industry standard IS-2000 (sometimes referred to as 1xRTT).

However, the invention can extend to use of other air interface protocols as well.

a. IS-2000 Radio Access Network

In an IS-2000 radio access network (RAN), the BTS serving each sector is coupled with a base station controller (BSC), which is then coupled with (i) a mobile switching center (MSC) that provides connectivity with the public switched telephone network (PSTN) and (ii) a packet data serving node (PDSN) that provides connectivity with a packet-switched network. The IS-2000 air interface in each sector is divided into channels on both the forward link (i.e., for communications from the BTS to the wireless communication devices (WCDs)) and the reverse link (for communications from the WCDs to the BTS), each channel being defined by a unique "Walsh" code used to modulate communications on the channel and being further defined by a unique "PN Offset" of the sector. Several of the channels are reserved to be used as overhead control channels for managing radio link communications, such as an "access channel" used on the reverse link to convey origination messages to the RAN, a "paging channel" used on the forward link to convey page messages to WCDs, and a "pilot channel" on the forward link to convey the sector's PN offset. The remaining channels are then reserved for use as traffic channels to carry bearer communications such as voice and data.

To acquire packet data connectivity in an IS-2000 system, a WCD sends a packet-data origination message over the access channel to the RAN, and the message passes to the MSC. The MSC then directs the BSC to assign a traffic channel for use by the WCD to engage in packet-data communications, and the BSC responsively sends a directive over a control channel to the WCD to cause the WCD to tune to that traffic channel. Further, a packet control function (PCF) associated with the BSC signals to the PDSN to establish an "R-P" (radio-packet) tunnel between the BSC/PCF and the PDSN, and the PDSN and WCD then negotiate with each other to establish a data link layer connection such a point-to-point protocol (PPP) session. Thereafter, the WCD sends to the PDSN a Mobile-IP registration request (MIP RRQ), which the PDSN (as a Mobile-IP Foreign Agent (FA)) forwards over the packet-switched network to a Mobile-IP Home Agent (HA), and the HA responsively assigns an IP address to the WCD for communicating on the packet-switched network. Provided with an IP address, a data link with the PDSN, and a radio link (traffic channel) with the RAN, the WCD can then engage in packet-data communications with other entities on the packet-switched network.

In a typical IS-2000 system, a WCD can be programmed to automatically acquire packet-data connectivity (by sending an origination request to trigger the above process) upon power-on. Once the WCD acquires packet-data connectivity, it is considered to be in an "active" state, in that an air interface traffic channel is reserved for its use. To conserve radio resources, the BSC will then release the WCD's traffic channel automatically if a threshold period of time passes without any packet-data flowing to or from the WCD. The WCD will then be in a "dormant" state, in which it will maintain its data link with the PDSN and its assigned IP address, but it will have no radio link (i.e., no assigned traffic channel).

When a dormant WCD seeks to send packet-data, the WCD will send an origination message to the RAN that will trigger re-assignment of a traffic channel to the WCD, and the WCD, now in an active state, can then send the packet-data. Similarly, when the PDSN and/or BSC receives packet-data destined for a dormant WCD, the BSC will page the WCD over the air interface paging channel, which will trigger reacquisition of a traffic channel for the WCD, and the WCD, now in an active state, can then receive the packet-data.

In an IS-2000 system, latency in initiation of an instant chat session can arise at the originating end (the WCD that initiates the session), since it takes some time for the originating WCD to acquire packet-data connectivity in the manner described above, whether from scratch (including acquisition of a radio link, a data link, and an IP address) or as a dormant-to-active transition (acquiring just a radio link, given a pre-existing data link and IP address). Further, latency can arise at each terminating end, since it similarly takes some time to page a terminating WCD and to cause the WCD to then acquire packet-data connectivity (typically as a dormant-to-active transition). In some cases, the dormant-to-active transition on the originating end could be on the order of 3 seconds, and the dormant-to-active transition on the terminating end (including the time to page the terminating WCD) could be on the order of 4-6 seconds. In total, this latency in initiating an instant chat session is highly undesirable.

On the other hand, IS-2000 is fairly well optimized to support packet-based real-time media communications, such instant-chat sessions. One reason for this is that, under IS-2000, when a WCD has an active packet-data connection, the WCD has a dedicated air interface traffic channel reserved for its use. Although the dedicated traffic channel might have a relatively low speed, its dedicated nature tends to avoid issues such as jitter and the like that are often associated with packet-switched (or other non-dedicated) connections.

b. IS-856 Radio Access Network

Under IS-2000, the highest rate of packet-data communications theoretically available on a fundamental traffic channel of the forward link is 9.6 kbps. In order to provide higher rate packet-data service to support higher bandwidth applications, the industry has introduced a new "high rate packet data (HRPD) system," which is defined by industry standard IS-856. IS-856 leverages the asymmetric characteristics of most IP traffic, in which the forward link typically carries a heavier load than the reverse link. Under IS-856, the forward link uses time division multiplexing (TDM), in order to allocate all power in a sector to a given user at any moment, while the reverse link retains largely the traditional IS-2000 code division multiplexing (CDM) format, albeit with the addition of a "data rate control" (DRC) channel used to indicate the supportable data rate and best serving sector for the forward link. The end result is that a WCD operating under IS-856 can, in theory, receive packet-data at a rate of at least 38.4 kbps and up to 2.4 Mbps.

The IS-856 forward link is divided into time slots of length 2048 chips, and each time slot is further time division multiplexed to carry various channels, including a pilot channel, a Medium Access Control (MAC) channel, and, if any traffic exists, a forward traffic channel and a "control" channel. As in IS-2000, each sector in IS-856 is defined by a PN offset, and the pilot channel carries an indication of the sector's PN offset.

To acquire packet data connectivity under IS-856, after a WCD first detects an IS-856 carrier, the WCD sends to its BSC (or "RNC" (radio network controller), as it is also known) a UATI (Universal Access Terminal Identifier) request, and receives in response an International Mobile Station Identifier (IMSI), which the WCD can then use to identify itself in subsequent communications with the BSC. The WCD then sends a connection-request to the BSC, and the BSC responsively invokes a process to authenticate the WCD and to have the WCD acquire a data link.

In particular, the BSC sends an access request to an Access Network AAA (ANAAA) server, and the ANAAA server authenticates the WCD. The BSC then assigns radio resources for the data session, by directing the WCD to operate on a particular time slot traffic channel on the forward link and a particular Walsh coded traffic channel on the reverse link. Further, the BSC signals to the PDSN, and the PDSN and WCD then negotiate to establish a PPP data link. In addition, as in the IS-2000 process, the WCD then sends an MIP RRQ to the PDSN, which the PDSN forwards to a HA, and the HA assigns a mobile-IP address for the WCD to use.

As in IS-2000, once the WCD has acquired an IS-856 radio link, a data link, and an IP address, the WCD is considered to be in an active mode. In the active mode, the WCD is given full use of the sector power in its assigned time slot (i.e., each time its time slot occurs), which facilitates higher rate data communication. Further, as in IS-2000, if the WCD does not send or receive data for a defined period of time, the WCD enters a dormant mode. In the dormant mode, an IS-856 system maintains the logical state of the WCD's session (e.g., IP address, PPP state, and radio link session information), while releasing the WCD's radio link resources (e.g., the time slot that had been assigned for use by the WCD). With the maintained session state, the WCD can quickly re-acquire a radio link so as to send or receive packet data, thereby giving the appearance that the WCD is "always on."

As in IS-2000, latency in initiation of an instant chat session can arise in an IS-856 system at both the originating end and the terminating end. However, given the arrangement of IS-856, including its maintenance of logical connection state, the latency in IS-856 will tend to be far less than in IS-2000. On the originating end, for instance, the dormant-to-active transition under IS-856 may be on the order of 0.5 seconds, as compared with about 3 seconds under IS-2000. On the terminating end, the dormant-to-active transition in IS-856 may be on the order of 1 to 3 seconds, as compared with about 4-6 seconds under IS-2000. Given this lower expected latency in IS-856, it makes sense to use IS-856 for initiating an instant chat session.

On the other hand, IS-856 is not as well optimized as IS-2000 to support packet-based real-time media communications such as instant-chat sessions. One reason for this is that, under IS-856, a limited number of time slots exist, and so an IS-856 BSC applies a scheduling algorithm that dynamically allocates the timeslots to active WCDs. As a result, depending on the number of active WCDs currently in the sector, an active WCD may or may not always have a time slot. This non-guaranteed bandwidth allocation can reek havoc on packet-based real-time media communications, introducing jitter and other undesired effects.

On the other hand, IS-2000 is fairly well optimized to support packet-based real-time media communications, such instant-chat sessions. One reason for this is that, under IS-2000, when a WCD has an active packet-data connection, the WCD has a dedicated air interface traffic channel reserved for its use. Although the dedicated traffic channel might have a relatively low speed, its dedicated nature tends to avoid issues such as jitter and the like that are often associated with packet-switched (or other non-dedicated) connections.

c. Hybrid Systems

Given the proliferation of legacy IS-2000 systems, IS-856 was designed to be backwards compatible and to facilitate "hybrid" operation. A "hybrid access terminal" is defined as a WCD that can operate on both IS-2000 and IS-856 networks.

In a hybrid system, IS-2000 and IS-856 coverage are provided on different carrier frequencies, each of which is 1.25 MHz in bandwidth for consistency with legacy operation. Further most IS-856 systems are provided as overlays on existing IS-2000 systems, such that a given BSC provides either IS-2000 coverage or both IS-2000 and IS-856 coverage. For an IS-2000 sector, the BSC may have just an IS-2000 circuit card. For a hybrid IS-2000/IS-856 sector, on the other hand, the BSC may have both an IS-2000 circuit card to facilitate IS-2000 operation and an IS-856 circuit card to facilitate IS-856 operation. A typical hybrid device will be programmed to use an IS-856 data connection when faced with the choice between IS-856 and IS-2000, i.e., when in a hybrid sector.

By standard design, when a hybrid terminal is operating in an IS-856 system, it will also periodically monitor the control channels in the IS-2000 system, in search of any incoming voice calls, SMS messages, or the like, and to monitor pilot signals to facilitate handoff. In the active IS-856 mode, the terminal periodically (e.g., every 5 seconds) tunes to the frequency of the IS-2000 system to monitor the IS-2000 control channels and then tunes back to the IS-856 frequency to resume the active data session. In the dormant/idle IS-856 mode, the terminal operates in a slotted manner to monitor both the IS-856 control channel and the IS-2000 control channels.

Further, because IS-856 is typically provided as an overlay on an existing IS-2000 system, it is possible that a hybrid terminal may need to hand off from a hybrid sector (providing both IS-2000 and IS-856 coverage) to an IS-2000 sector (providing no IS-856 coverage), e.g., as it moves physically out of a hybrid sector and into an IS-2000 sector. In practice, each time the terminal tunes to the IS-2000 frequency to monitor the IS-2000 control channels, the terminal can monitor IS-2000 pilot signal strength and can trigger a handoff to the IS-2000 system through conventional procedures.

If this IS-856 to IS-2000 handoff occurs when the terminal is in an idle/dormant IS-856 mode, then the terminal will simply register in the IS-2000 system and drop its IS-856 radio link. That is, the terminal may request packet data connectivity in the IS-2000 system and consequently obtain an IS-2000 radio link. Further, because the same PDSN and mobile-IP home agent likely serves both the IS-2000 and IS-856 systems, the terminal may simply maintain its existing PPP session and mobile-IP address. As one way to accomplish this in practice, when the terminal acquires an IS-2000 radio link and conventionally sends a MIP RRQ to the PDSN, the terminal would include its already-assigned mobile-IP address in the MIP RRQ. When the PDSN receives the MIP RRQ and detects that the terminal already has a mobile-IP address, the PDSN would forego sending the MIP RRQ to the home agent. Instead, the PDSN would responsively work with the IS-2000 BSC/PCF to set up a new R-P tunnel for the IS-2000 connection and would tear down the R-P tunnel that it had with the IS-856 BSC/PCF.

If the IS-856 to IS-2000 handoff occurs when the terminal is in an active IS-856 mode, on the other hand, the terminal will, as a standard matter, first switch to an IS-856 dormant mode and will then acquire dedicated packet-data connectivity in the IS-2000 system in the manner described in the preceding paragraph.

It is also possible that a hybrid terminal operating on an IS-2000 system may hand off from an IS-2000 sector to a hybrid sector. In this regard, when a hybrid terminal is in an idle/dormant IS-2000 state, the terminal will perform periodic off-frequency searches in an effort to discover existing IS-856 systems. If the terminal thereby finds an IS-856 system, it will acquire IS-856 packet-data connectivity and then operate in the IS-856 system as described above. Existing standards generally do not permit a hybrid terminal that is in an active IS-2000 mode to hand off to IS-856, mainly because, in the active IS-2000 mode, no provision is made for discovering co-existing IS-856 systems. However, once the terminal switches to an IS-2000 dormant mode, it may then lock onto an IS-856 system as described above.

When in an idle IS-2000 mode, if a hybrid terminal locks onto an IS-856 system and acquires packet-data connectivity, the terminal will apply the conventional packet-data connection process, including acquiring an IS-856 radio link, and a PPP link and IP address. When in a dormant IS-2000 mode, the terminal will also apply the conventional packet-data connection process, but, as with a handoff from IS-856 to IS-2000, the terminal may only need to acquire an IS-856 radio link, as the PDSN may recognize that the terminal already has an assigned IP address.

FIG. 1 illustrates an example hybrid communication system for serving a hybrid terminal 14. As shown in FIG. 1, the example hybrid system includes an IS-856 BTS 16 that radiates to define at least one IS-856 sector 18 in which terminal 14 can operate. The IS-856 BTS 16 is then coupled with an IS-856 BSC 20, which includes or is coupled with an IS-856 PCF 22. The IS-856 PCF 22 is then coupled with a PDSN 24 that provides connectivity with a packet-switched network 26. Sitting on the packet-switched network is, in turn, a mobile-IP home agent 28.

The example hybrid system further includes an IS-2000 BTS 30 that radiates to define at least one IS-2000 sector 32 in which terminal 14 can also operate. The IS-2000 BTS 30 is then coupled with an IS-2000 BSC 34, which includes or is coupled with an IS-2000 PCF 36. The IS-2000 PCF 36 is then similarly coupled with PDSN 24, thus providing connectivity with the packet-switched network 26.

For simplicity, FIG. 1 depicts the IS-856 BTS 16 as being physically separate from the IS-2000 BTS 30, and the IS-856 BSC and PCF 20, 22 as being physically separate from the IS-2000 BSC and PCF 34, 36. Further, FIG. 1 depicts the IS-856 sector 18 as being physically separate from, though partially overlapping, the IS-2000 sector 32. In actual practice, however, some elements of the IS-856 system and IS-2000 system may be co-located or may at least share certain resources. For example, a single BTS antenna tower could be provided to serve both the IS-856 system and the IS-2000 system. As another example, as noted above, a single BSC could be provided, with separate circuit-cards to support IS-856 and IS-2000 operation. And as yet another example, the IS-856 and IS-2000 sectors 18, 32, while operating under different air interface protocols, may be substantially coterminous.

In a preferred embodiment, as shown, the IS-856 and IS-2000 systems share a common PDSN 24 and a common mobile-IP home agent 28. Advantageously, as noted above, this can enable an efficient handoff of packet-data connectivity between the IS-856 and IS-2000 systems, with the only changes being (i) a transition from one radio link to another and (ii) a transition from one R-P link to another.

2. Example Operation

Figure 2:
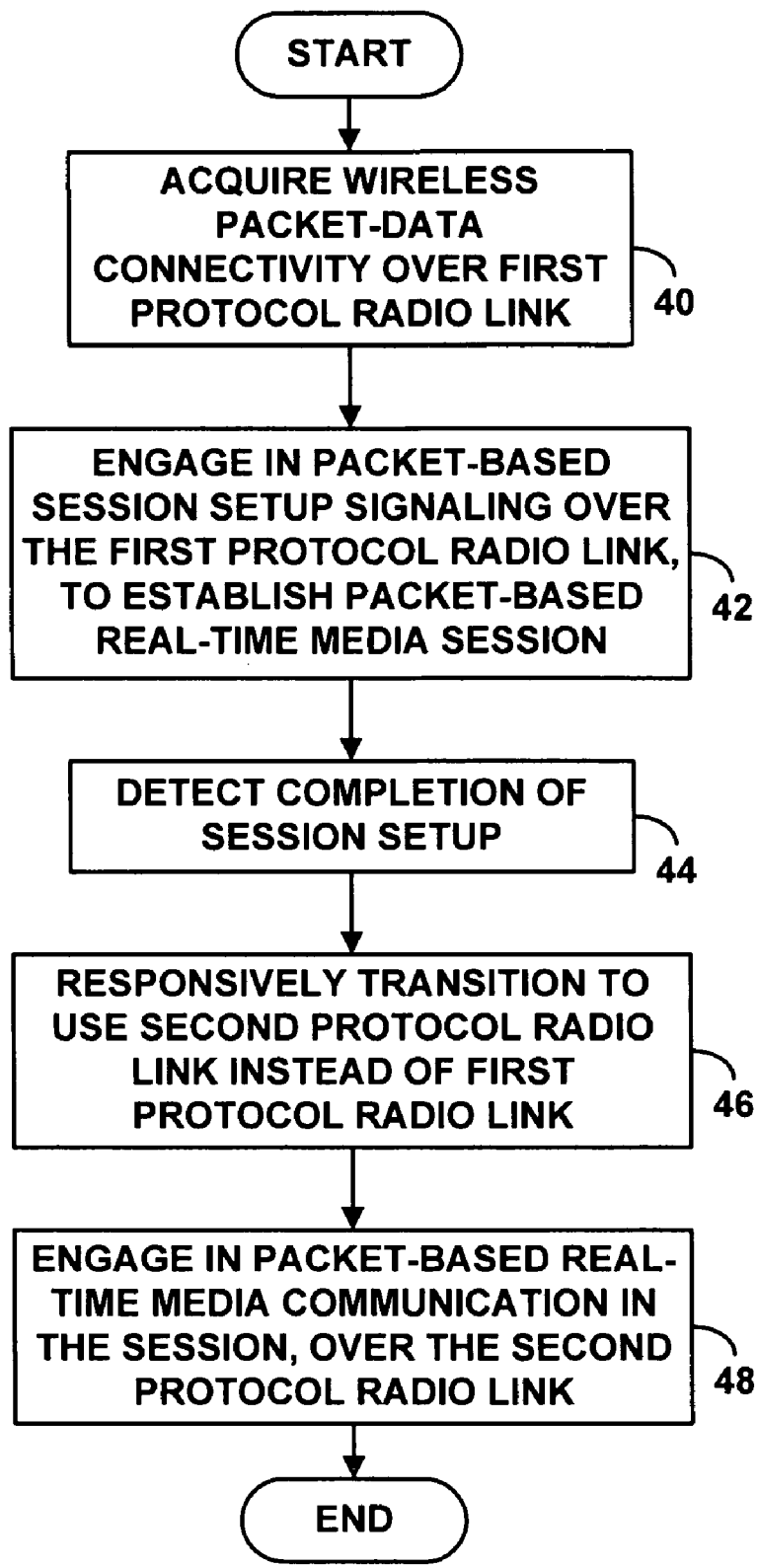
FIG. 2 is a flow chart depicting a process carried out in accordance with the exemplary embodiment.

As noted above, according to the exemplary embodiment, a WCD will use one air interface protocol when engaging in signaling to establish a packet-based real-time media conference, and the WCD will then automatically switch over to use another air interface protocol for bearer communication in the established conference. FIG. 2 is a flow chart generally depicting this process.

As shown in FIG. 2, at step 40, the WCD will first acquire wireless packet data connectivity, including obtaining a first protocol radio link. At step 42, the WCD will then engage in packet-based session setup signaling (such as SIP signaling) over the first protocol radio link, to establish a packet-based real-time media session. At step 44, the WCD will then detect completion of session setup, and, at step 46, the WCD will responsively transition to use a second protocol radio link instead of the first protocol radio link. In turn, at step 48, the WCD will engage in packet-based real-time media communication over the second protocol radio link, in the established session.

Figure 3:
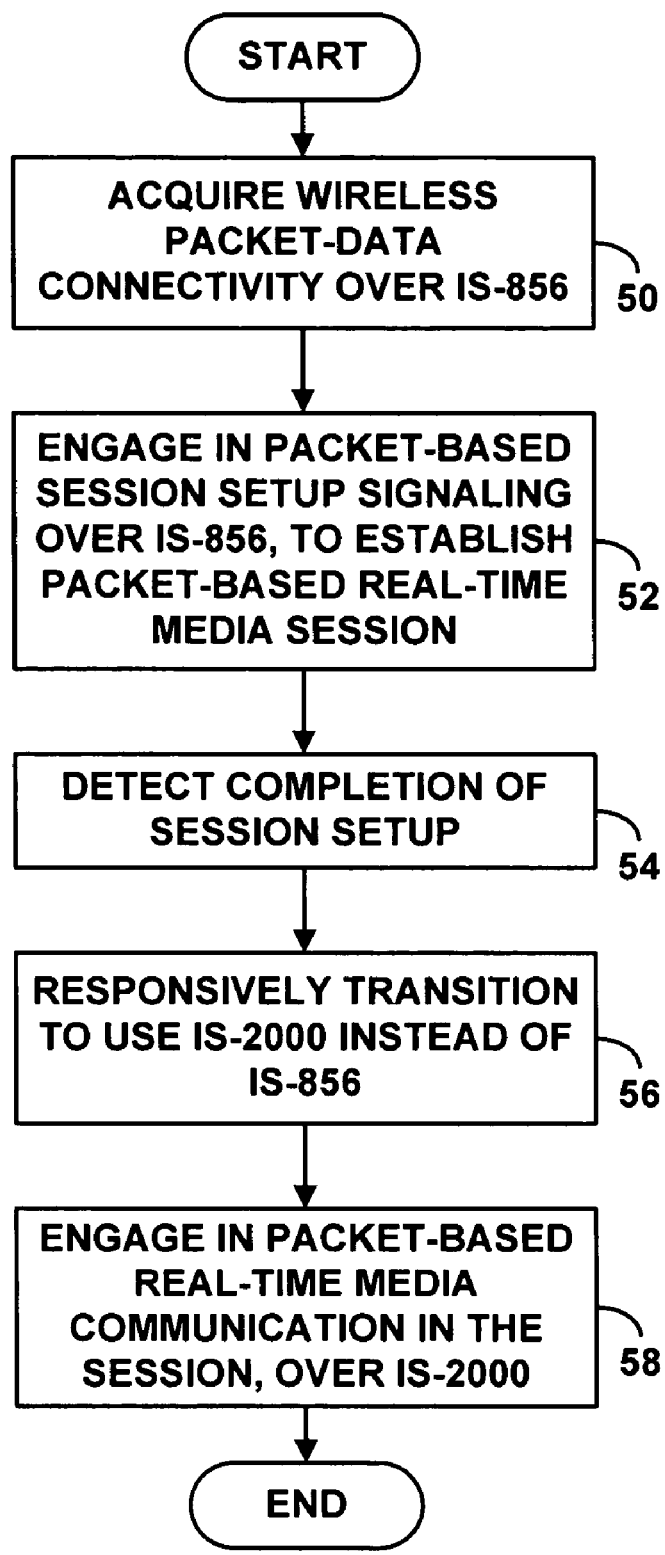
FIG. 3 is a flow chart depicting a more specific process carried out in accordance with the exemplary embodiment.

Given that IS-856 is expected to work better for initiating an instant-chat session (due to faster radio link acquisition) but that IS-2000 is expected to work better for packet-based real-time media communication (due to substantially guaranteed bandwidth), a preferred embodiment will involve using IS-856 for session initiation and then automatically switching over to IS-2000 for bearer communication in the established session. FIG. 3 is a flow chart like FIG. 2, modified to show this arrangement, in which the first protocol is IS-856 and the second protocol is IS-2000.

As shown at step 50 in FIG. 3, a WCD will first acquire wireless packet data connectivity, including obtaining an IS-856 radio link. At step 52, the WCD will then engage in packet-based session setup signaling (such as SIP signaling) over the IS-856 radio link, to establish a packet-based real-time media session. At step 54, the WCD will then detect completion of session setup. And at step 56, the WCD will responsively transition to have packet-data connectivity over an IS-2000 radio link instead of the IS-856 radio link. In turn, at step 58, the WCD will engage in packet-based real-time media communication over the IS-2000 radio link, in the established session.

As presently contemplated, the functions depicted in FIGS. 2 and 3 can be carried out by a WCD at either the originating end or terminating end of a packet-based real-time media session, since both ends would need to engage in session setup signaling to establish the session and would then need to engage in bearer media communication in the established session. In either case, the WCD carrying out the inventive function will preferably be a hybrid WCD, i.e., a WCD that is capable of operating selectively under the first radio link protocol (e.g., IS-856) or the second radio link protocol (e.g., IS-2000).

In the preferred embodiment, the hybrid WCD will automatically acquire wireless packet-data connectivity when it first powers on or in response to a designated trigger such as a user putting the WCD into an instant-chat mode (e.g., by invoking an instant-chat client application). As a starting point, the invention assumes that the WCD has wireless packet-data connectivity under the first protocol radio link, e.g., IS-856. In an IS-856/IS-2000 hybrid system where a WCD prefers to use IS-856 when IS-856 is available, this would be a default mode in any event. However, the WCD has likely moved into a dormant mode.

Figure 4:
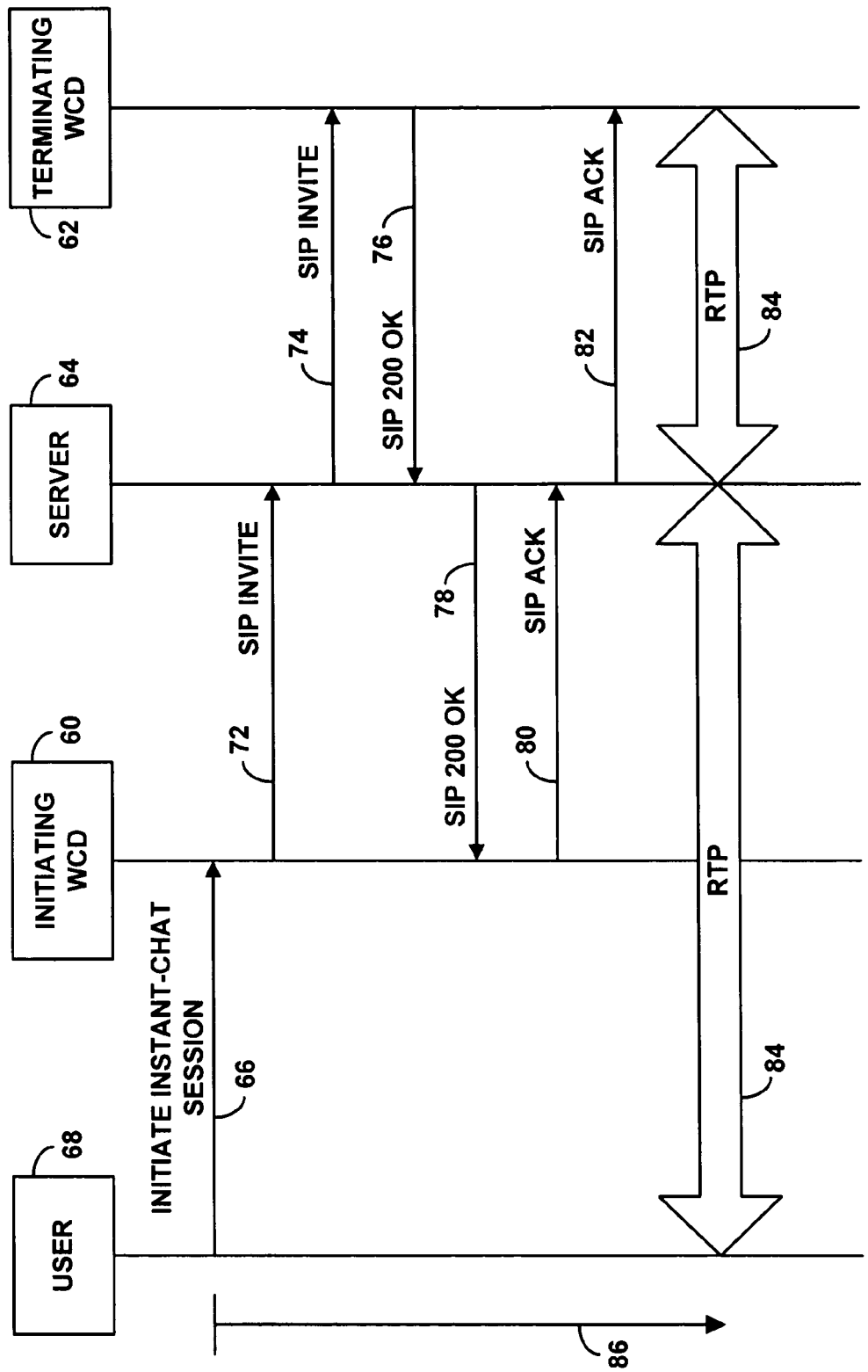
FIG. 4 is message flow diagram depicting signaling used to set up a packet-based real-time media session.

As noted above, the function of engaging in packet-based session setup signaling to establish a packet-based real-time media session may involve engaging in SIP signaling (e.g., in a tokenized form). FIG. 4 depicts an example SIP message flow for establishing an instant-chat session between a single initiating WCD 60 and a single terminating WCD 62, through a communication server 64, where both the initiating WCD 60 and terminating WCD 62 are currently in a dormant IS-856 mode. It should be understood, however, that many variations from this example are possible. Further, elements (e.g., proxies, etc.) in addition to, or instead of, those shown may be involved in the process.

As shown in FIG. 4 at step 66, a user 68 first directs an instant-chat application on WCD 60 to initiate an instant-chat session with WCD 62 (or, more likely, with a user 70 of WCD 62), such as by pressing and holding down an instant-chat button on WCD 60. At step 72, WCD 60 responsively generates and sends a SIP "INVITE" message to communication server 64, designating WCD 62 (e.g., by SIP address) as the target. To send this message, since WCD 60 is currently in a dormant IS-856 mode, WCD 60 would first quickly transition to an active IS-856 mode and would then send the SIP INVITE message over IP to server 64.

At step 74, server 64 then sends a SIP INVITE message over IP to WCD 62. Once this message reaches the IS-856 RAN, an IS-856 BSC would detect that WCD 62 is currently dormant and would responsively page WCD 62 to cause WCD 62 to transition to an active IS-856 mode. WCD 62 would then receive the SIP INVITE message. In turn, to accept the session-invitation, at step 76, WCD 62 then sends a SIP "200 OK" message via its established IS-856 packet-data connection to server 64. And at step 78, server 64 then sends a SIP 200 OK message of its own to WCD 60, which WCD 60 receives via its established IS-856 packet-data connection. To complete setup of an RTP leg between WCD 60 and server 64, at step 80, WCD 60 then sends a SIP "ACK" message via its established IS-856 connection to server 64. And finally, to complete setup of an RTP leg between server 64 and WCD 62, at step 82, server 64 sends a SIP ACK message to WCD 62, which WCD 62 receives via its established IS-856 connection. At step 84, the packet-based real-time media session may then commence, with server 64 bridging the RTP legs together so that the users can communicate with each other.

As noted above, an initiating WCD can be arranged to buffer media during session initiation, in order to mitigate setup latency. This buffering is illustrated by the arrow 86 down the side of the message flow in FIG. 4. The arrow extends from the moment the user first instructs WCD 60 to initiate the instant-chat session until the moment when the initiating RTP leg has been fully established. Once the initiating RTP leg has been established, the initiating WCD 60 may then begin sending the buffered media via RTP to server 64. If the initiating user 68 is still talking (or WCD 60 is otherwise still receiving media) when the initiating RTP leg is finally established, WCD 60 can begin to transmit the buffered media while continuing to receive and buffer additional media. Once the user finishes talking (e.g., releases the instant-chat button), WCD 60 can stop buffering and begin transmitting.

As presently contemplated, the function of detecting completion of session setup, so as to then trigger a transition from the first protocol radio link (e.g., IS-856) to the second protocol radio link (e.g., IS-2000), can take various forms. By way of example, at the initiating end, the function can involve simply detecting transmission of a final SIP ACK message to the server 64, to complete establishment of the initiating RTP leg. Similarly, at the terminating end, the function can involve simply detecting receipt of a final SIP ACK message from the server 64, to complete establishment of the terminating RTP leg.

As another example, if the initiating end buffers media to help mitigate setup latency, then the function of detecting completion of session setup can involve detecting the later of (i) the initiating end receiving a SIP ACK message from the server and (ii) the initiating end finishing its initial receipt of media. For instance, if the initiating user 68 finishes initially talking and releases the instant-chat button before the initiating RTP leg is fully established, then WCD 60 can treat its receipt of a SIP ACK message from the server as an indication that session setup is complete, so as to trigger a transition from IS-856 to IS-2000. Alternatively, if the initiating user 68 finishes initially talking and releases the instant-chat button after the initiating RTP leg is fully established, then WCD can treat the release of the instant-chat button as an indication that session setup is complete, so as to trigger the transition from IS-856 to IS-2000. The function of detecting completion of session setup can take other forms as well, such as detecting the occurrence of other events after session setup signaling is completed.

The function of the WCD transitioning from the first protocol radio link to the second protocol radio link can also take various forms. By way of example, if the WCD is in an active IS-856 mode, the WCD may automatically hand off to IS-2000 in the manner described above. Namely, the WCD may first switch to a dormant IS-856 mode and then acquire IS-2000 packet-data connectivity. More particularly, the WCD may programmatically send a Release Radio Connection message to the IS-856 BSC and may then send a packet-data origination message to the IS-2000 BSC so as to acquire an IS-2000 radio link and to trigger establishment of a new R-P tunnel between the PDSN and the IS-2000 BSC/PCF. Meanwhile, the WCD may maintain its existing PPP link with the PDSN and its existing mobile-IP address, so that it can then continue to engage in packet-data communication.

In a preferred embodiment, a WCD may also programmatically transition from the second protocol radio link back to the first protocol radio link (albeit with a different traffic channel, e.g., time slot, allocation) when the packet-based real-time media session is finished. By reverting back to the first protocol radio link upon completion of the packet-based real-time media session, the WCD will then be prepared to engage in session setup signaling again via the first protocol radio link.

Figure 5:
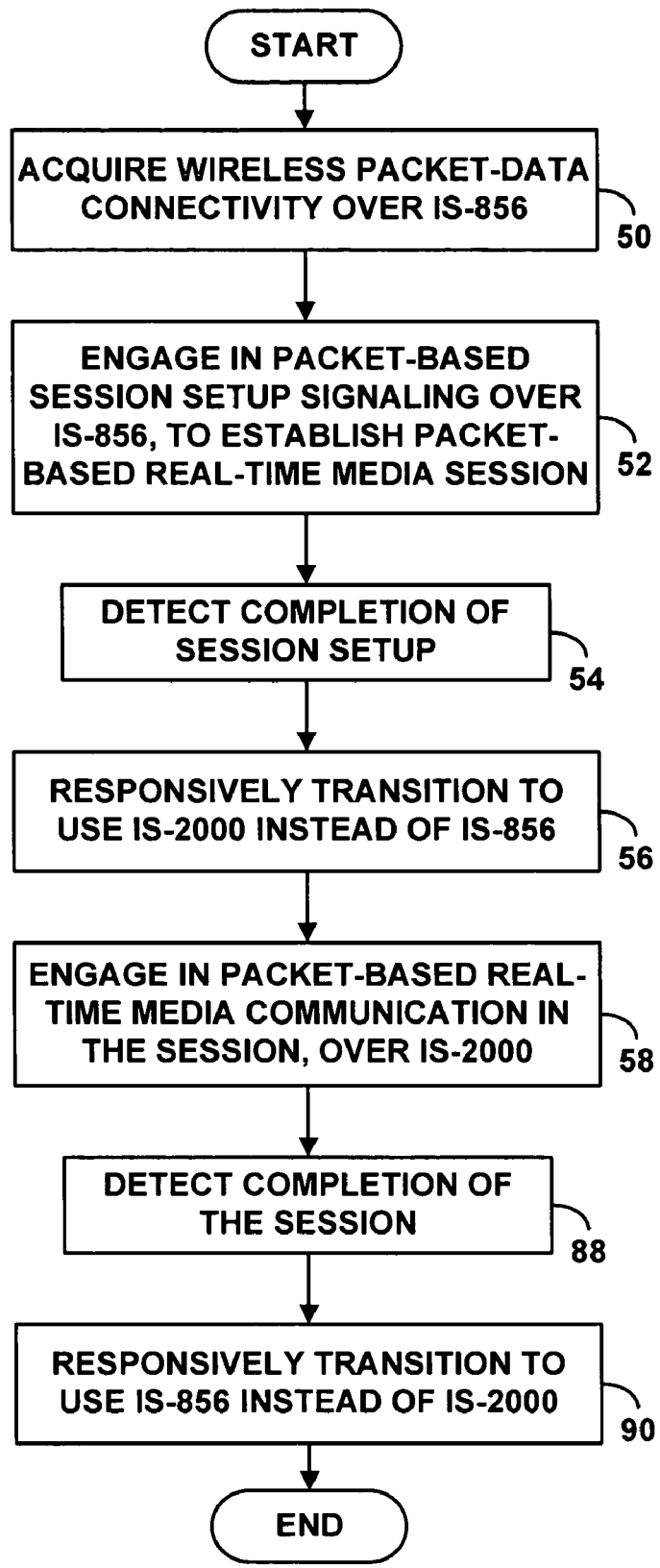
FIG. 5 is a flow chart depicting additional functions following the method of FIG. 3.

FIG. 5 is a flow chart depicting this reversion function following steps 50-58 of FIG. 3. As shown at step 88 in FIG. 5, after the WCD engages in the packet-based real-time media session via the IS-2000 radio link, the WCD will detect completion of the packet-based real-time media session. At step 90, the WCD will then responsively revert to an IS-856 packet-data connection, so that it will be prepared to quickly engage in session setup signaling again should the need arise.

The function of detecting completion of the packet-based real-time media session, like other functions described above, can take various forms. By way of example, if SIP is used for session signaling, the function can involve detecting transmission or receipt of a SIP message that signals the end of the session, or at least the end of a leg of the session. For instance, the function can involve detecting transmission or receipt of a SIP "BYE" message, which is used to tear down an RTP session, or transmission or receipt of a SIP 200 OK message sent in response to a SIP BYE message. Other examples are possible as well.

Further, the function of transitioning from an IS-2000 packet data connection to an IS-856 packet data connection can also take various forms. By way of example, the WCD can simply wait for the IS-856 active-to-dormant timer to expire, so that the WCD then normally transitions to a dormant IS-856 mode, and the WCD may then programmatically acquire IS-856 packet-data connectivity as described above, preferably maintaining its existing PPP link and mobile-IP address. As another example, the WCD can autonomously switch to a dormant IS-2000 mode (without waiting for the normal active-to-dormant time period to expire) and can then similarly acquire IS-856 packet-data connectivity.

3. Example Wireless Communication Device

Figure 6:
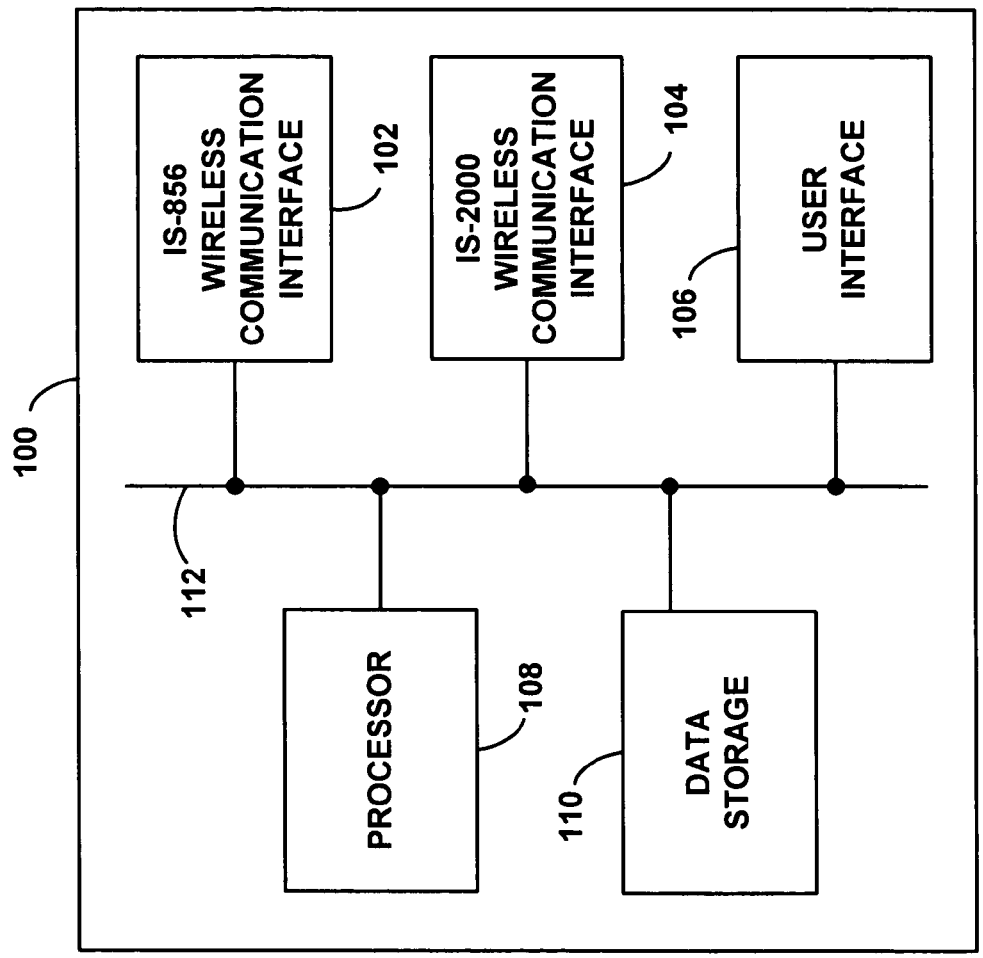
FIG. 6 is a simplified block diagram of an exemplary wireless communication device arranged to carry out the exemplary embodiment.

Finally, referring to FIG. 6, a simplified block diagram of an exemplary WCD 100 is provided, to illustrate some of the functional components that would likely be found a the WCD arranged to operate in accordance with the exemplary embodiment. The illustrated WCD is preferably capable of operating as an initiating WCD (to initiate a packet-based real-time media session) and as a terminating WCD (to be the target of a packet-based real-time media session). Further, the WCD is preferably a hybrid WCD, capable of operating under both IS-2000 and IS-856. In a preferred embodiment, the WCD will be a cellular telephone. However, it can take other forms as well.

Exemplary WCD 100 preferably includes an IS-2000 wireless communication interface 102, an IS-856 wireless communication interface 104, a user interface 106, a processor 108, and data storage 110, all of which may be coupled together by a system bus or other mechanism 112, and all of which may be situated within or on a housing (not shown).

IS-2000 wireless communication interface 102 facilitates wireless communication according to the IS-2000 protocol. In practice, IS-2000 wireless communication interface 102 may comprise a suitably designed chipset, coupled with a radio-frequency (RF) antenna. Preferably, the chipset is arranged to facilitate establishment and maintenance of IS-2000 wireless packet-data connectivity, in the manner described above for instance.

IS-856 wireless communication interface 104, on the other hand, facilitates wireless communication according to the IS-856 protocol. Like IS-2000 wireless communication interface 102, IS-856 wireless communication interface 104 may comprise a suitably designed chipset, coupled with an RF antenna. Preferably, the chipset is arranged to facilitate the establishment and maintenance of IS-856 wireless packet data connectivity, also in the manner described above. Both wireless communication interfaces 102, 104 can share a common chipset (e.g., a dual-band (IS-2000 and IS-856) chipset) and/or a common antenna.

User interface 106 facilitates user interaction with WCD 100. Thus, in a preferred embodiment, user interface 106 includes audio input and output mechanisms, such as a microphone and speaker, video input and output mechanisms, such as a display screen and a camera, and various user-selection mechanisms, such as a keypad, touch-sensitive screen, or a voice-recognition engine, as well as an instant-chat button for initiating an instant-chat session or for requesting the floor in an instant chat session. Further, user interface 106 may include digital-to-analog and analog-to-digital conversion circuitry, to facilitate receiving and digitizing media (e.g., voice and/or video), and playing out digitized media (e.g., voice and/or video).

Processor 108 includes one or more processors, such as one or more general purpose processors and/or one or more dedicated processors (e.g., ASICs, DSPs, etc.) Data storage 110, in turn, may comprise volatile and/or non-volatile memory and can be integrated in whole or in part with processor 108. Data storage 110 preferably holds program instructions executable by processor 108 to carry out various logic functions described herein. (Alternatively, the logic functions can be defined by hardware, firmware, and/or any combination of hardware, firmware and software on the WCD.)

By way of example, the program instructions in data storage 110 will preferably define an instant-chat client application, such as a push-to-talk application, which a user can invoke through a menu selection or by engaging the instant-chat button of user interface 106. Further, the program instructions will define logic for acquiring packet-data connectivity, both under IS-856 and IS-2000. In particular, the logic may cause the WCD to acquire IS-856 packet-data connectivity upon power-on, upon execution of the instant-chat application, and/or in response to some other triggering event, so that the WCD has IS-856 packet-data connectivity at the time an instant-chat session is initiated. Further, the logic will cause the WCD to automatically switch to IS-2000 packet-data connectivity upon completion of session setup, so as to then engage in bearer communication in the session via IS-2000. And the logic may further cause the WCD to automatically switch back to IS-856 packet-data connectivity upon conclusion of the session.

The program instructions in data storage 110 also preferably define logic for engaging in session setup and for engaging in packet-based real-time media communication. For instance, the program instructions may define a SIP messaging stack for engaging in SIP signaling such as that described above, an IP protocol stack for engaging in IP communications, RTP client logic for sending and receiving real-time media over IP, and one or more media codecs (e.g., G.723.1, etc.) for encoding and decoding media. Further, the program instructions (particularly the instant-chat application) preferably define logic for buffering media at the time of session initiation. And still further, the program instructions preferably define logic for determining when session setup is complete, so as to trigger a transition from IS-856 to IS-2000, and logic for determining when the session is concluded, so as to trigger a reversion back to IS-856.

4. Conclusion

An exemplary embodiment of the present invention has been described above. Those skilled in the art will understand, however, that changes and modifications may be made to this embodiment without departing from the true scope and spirit of the present invention, which is defined by the claims.

By way of example, although the foregoing description refers mainly to use of IS-856 and IS-2000 as the first and second air interface protocols, it should be understood (as noted above) that other air interface protocols could be used instead. Similarly, although the foregoing refers to use of SIP as the session signaling protocol, other session signaling protocols (e.g., H.323) could be used instead. Still further, although the foregoing refers to application of the invention in the context of establishing an instant-chat session, the invention could just as well apply in the context of setting up other sorts of sessions, and regardless of whether the sessions involve use of a communication server. Other variations are possible as well.

We claim:

1. In a hybrid wireless communication device, a method comprising:
    the hybrid wireless communication device acquiring a first protocol radio link on a first carrier frequency;
    the hybrid wireless communication device engaging in packet-based session setup signaling with a server via the first protocol radio link, to set up a packet-based real-time media session with the server;
    the hybrid wireless communication device detecting completion of the packet-based session setup signaling;
    responsive to detecting the completion of the packet-based session setup signaling, the hybrid wireless communication device automatically acquiring a second protocol radio link on a second carrier frequency, wherein the second protocol radio link is different from the first protocol radio link;
    via the second protocol radio link, the hybrid wireless communication device engaging in the packet-based real-time media session with the server; and
    upon completion of the packet-based real-time media session, the hybrid wireless communication device automatically transitioning to the first protocol radio link, so as to be prepared to once again use the first protocol radio link to engage in packet-based session setup signaling with the server.

2. The method of claim 1, wherein the first protocol radio link is an IS-856 radio link, and wherein the second protocol radio link is an IS-2000 radio link.

3. The method of claim 1, performed at an initiating hybrid wireless communication device.

4. The method of claim 1, performed at a terminating hybrid wireless communication device.

5. The method of claim 1, wherein the packet-based real-time media session comprises an instant-chat session selected from the group consisting of a push-to-talk session and a push-to-view session.

6. The method of claim 1, wherein the packet-based real-time media session comprises a Real-time Transport Protocol (RTP) session.

7. The method of claim 1, wherein the packet-based session setup signaling comprises Session Initiation Protocol (SIP) signaling.

8. The method of claim 7, wherein the hybrid wireless communication device detecting the completion of the packet-based session setup signaling includes the hybrid wireless communication device receiving a SIP ACK message.

9. The method of claim 1, wherein the hybrid wireless communication device is a cellular telephone.

10. In a hybrid wireless communication device, a method comprising:
    the hybrid wireless communication device acquiring an IS-856 protocol radio link, on a first carrier frequency;
    the hybrid wireless communication device engaging in packet-based session setup signaling with a server over the IS-856 protocol radio link, to establish a packet-based real-time media session with the server;
    the hybrid wireless communication device making a first determination that the packet-based session setup signaling is complete;
    responsive to the first determination, the hybrid wireless communication device automatically transitioning from (i) the IS-856 protocol radio link to (ii) an IS-2000 protocol radio link, on a second carrier frequency;
    the hybrid wireless communication device engaging in the packet-based real-time media session with the server, via the IS-2000 protocol radio link;
    the hybrid wireless communication device making a second determination that the packet-based real-time media session is complete; and
    responsive to the second determination, the hybrid wireless communication device automatically transitioning from (i) the IS-2000 protocol radio link to (ii) the IS-856 protocol radio link.

11. A hybrid wireless communication device comprising:
    means for acquiring a first protocol radio link on a first carrier frequency;
    means for engaging in packet-based session setup signaling via the first protocol radio link, to set up a packet-based real-time media session;
    means for detecting completion of the packet-based session setup signaling;
    means, responsive to detecting the completion of the packet-based session setup signaling, for the hybrid wireless communication device automatically acquiring a second protocol radio link on a second carrier frequency, wherein the second protocol radio link is different from the first protocol radio link;
    means, responsive to acquiring the second protocol radio link on the second carrier frequency, for engaging in the packet-based real-time media session via the second protocol radio link; and
    means for automatically transitioning to the first protocol radio link upon completion of the packet-based real-time media session, so as to be prepared to once again use the first protocol radio link to engage in packet-based session setup signaling.

12. The hybrid wireless communication device of claim 11, wherein the first protocol radio link is an IS-856 radio link, and wherein the second protocol radio link is an IS-2000 radio link.

13. The hybrid wireless communication device of claim 11, wherein the packet-based real-time media session comprises an instant-chat session selected from the group consisting of a push-to-talk session and a push-to-view session.

14. The hybrid wireless communication device of claim 11, wherein the packet-based real-time media session comprises a Real-time Transport Protocol (RTP) session.

15. The hybrid wireless communication device of claim 11, wherein the packet-based session setup signaling comprises Session Initiation Protocol (SIP) signaling.

16. The hybrid wireless communication device of claim 15, wherein means for detecting the completion of the packet-based session setup signaling includes means for the hybrid wireless communication device to receive a SIP ACK message.

17. The hybrid wireless communication device of claim 11, wherein the hybrid wireless communication device is a cellular telephone.

18. A hybrid wireless communication device comprising:

a first protocol radio link interface for communicating over a first protocol radio link;

a second protocol radio link interface for communicating over a second protocol radio link, wherein the second protocol radio link is different from the first protocol radio link;

a processor;

program logic for acquiring the first protocol radio link on a first carrier frequency;

program logic for engaging in packet-based session setup signaling via the first protocol radio link, to set up a packet-based real-time media session;

program logic for detecting that the packet-based real-time media session has been set up and for responsively transitioning from (i) the first protocol radio link to (ii) the second protocol radio link on a second carrier frequency;

program logic for then engaging in the packet-based real-time media session over the second protocol radio link; and program logic for, automatically transitioning to the first protocol radio link upon completion of the packet-based real-time media session, so as to be prepared to once again use the first protocol radio link to engage in packet-based session setup signaling.

* * * * *